Feb. 10, 1942. E. A. KEELER 2,272,914
MEASURING INSTRUMENT OF THE POTENTIOMETER TYPE
Filed Sept. 30, 1938 2 Sheets-Sheet 1
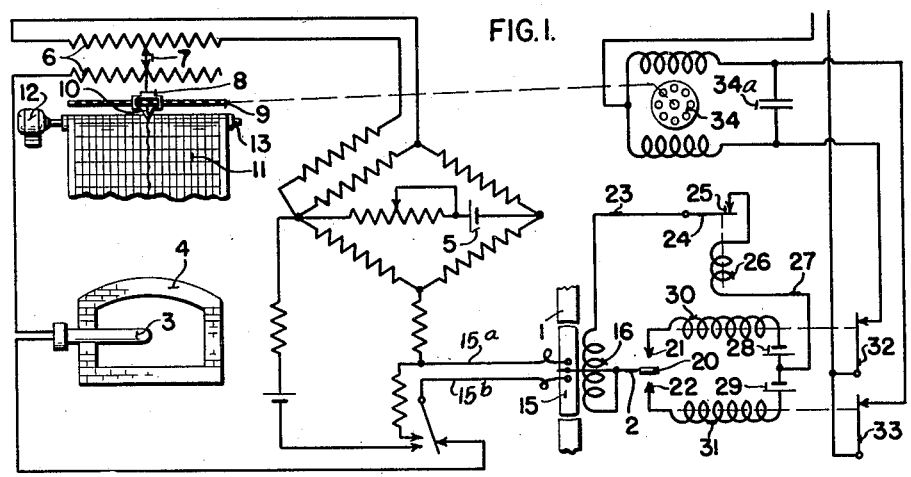
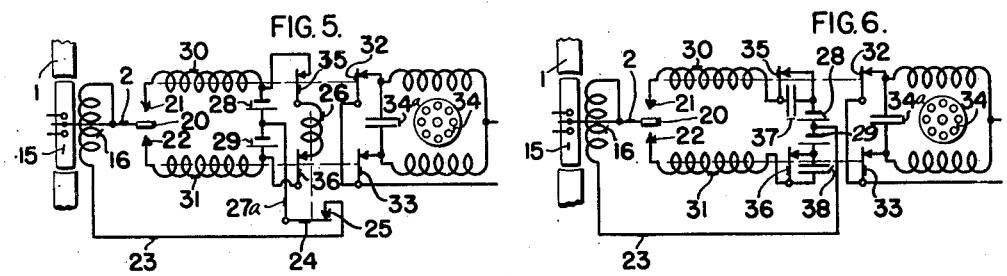
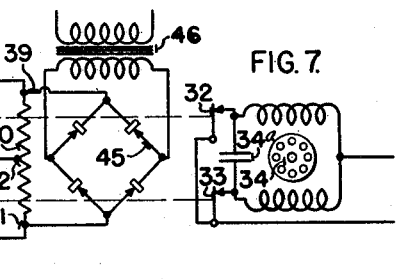
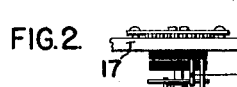
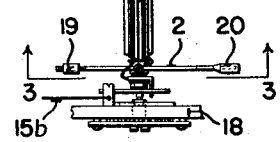
INVENTOR.
EARL A. KEELER
BY George M. Maushaup
ATTORNEY Feb. 10, 1942.   E. A. KEELER   2,272,914
MEASURING INSTRUMENT OF THE POTENTIOMETER TYPE
Filed Sept. 30, 1938   2 Sheets-Sheet 2

INVENTOR.
EARL A. KEELER
BY
ATTORNEY

Patented Feb. 10, 1942

2,272,914

UNITED STATES PATENT OFFICE 2,272,914

MEASURING INSTRUMENT OF THE POTENTIOMETER TYPE

Earl A. Keeler, Norristown, Pa., assignor to The Brown Instrument Company, Philadelphia, Pa., a corporation of Pennsylvania Application September 30, 1938, Serial No. 232,586

13 Claims. (Cl. 171—95)

The present invention relates to measuring instruments, and more particularly to an instrument that is both sensitive and rugged for measuring the value of a condition.

At the present time it is customary to measure high temperatures by means of a potentiometer circuit in which deflection of a galvanometer in response to variations in the voltage of a thermocouple, subjected to the temperature, is used to position a relay which in turn rebalances the potentiometer and adjusts a pen with respect to a chart. The difficulty with such an arrangement is that the relay mechanism is ordinarily both cyclic in operation and cumbersome. It is an object of my invention to do away with the necessity of a complicated relay system and the necessity of depending upon any cyclically operating mechanism in order to rebalance a potentiometer circuit and obtain a reading. To this end deflection of the galvanometer is directly used to disclose a circuit and operate a series of electrical relays to cause rebalancing of the potentiometer circuit. I also provide a mechanism that is free from any cyclic mechanism and is substantially instantaneous in its response to any variation of the value of the thermocouple voltage.

It is a further object of my invention to provide a measuring instrument which is rapid in action and one that is inherently stable in operation. Such an operation is accomplished with the additional feature of obtaining an accelerating action in the instrument by using a second coil in the galvanometer which upon energization thereof, is used to add an additional biasing force to the galvanometer. Upon the completion of a rebalancing operation a circuit through the additional or auxiliary coil is broken and a recoil action is produced which quickly returns the galvanometer toward its neutral position. It is a further object of my invention to provide a galvanometer which has two movable coils, one of which is in a measuring circuit to cause a deflection thereof, and the other of which is in an auxiliary or biasing circuit and is used to add an additional force to that of the first coil and to provide a means that produces a recoil action upon breaking of the circuit.

The various features of novelty which characterize my invention are pointed out with particularity in the claims annexed to and forming a part of this specification. For a better understanding of the invention, however, its advantages and specific objects obtained with its use, reference should be had to the accompanying drawings and descriptive matter in which I have illustrated and described a preferred embodiment of the invention.

In the drawings:

Fig. 1 is a wiring diagram of one form of my invention showing diagrammatically recording provisions and a furnace;

Fig. 2 is a side view of my novel galvanometer;

Fig. 3 is a view on line 3—3 of Fig. 2;

Fig. 4 is a fragmentary sectional view through one side of the galvanometer coils;

Figs. 5 to 7 are wiring diagrams of other embodiments of my invention;

Figure 11:
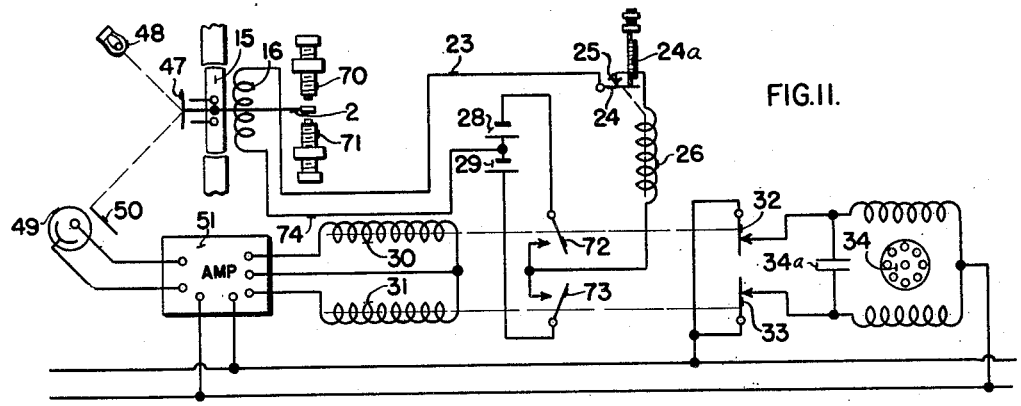
Fig. 11 is a wiring diagram of my invention in which the galvanometer pointer serves only to limit the deflection of the coil.

Referring first to Fig. 1, a galvanometer 1 having a pointer 2 is adapted to respond to unbalance in a null point potentiometric circuit, the latter of which may be of any suitable type, such as the Brown potentiometer circuit disclosed in Harrison Patent 1,898,124, issued February 21, 1933. Such circuits are well-known and it is sufficient for the present purpose to note that the potentiometer circuit includes a circuit branch including a source of variable potential to be measured such for example, as the thermocouple 3 inserted in a furnace 4 whose temperature is to be measured. An opposing circuit branch including a source of known potential such as the cell 5, and resistors 6, a variable portion of the latter of which may be connected into the opposed branches by means of a sliding contact 7 whereby the respective effects of the variable and known sources are made equal and opposite, and the galvanometer is thus rendered undeflected when the circuit is balanced for a given value of the E. M. F. of the thermocouple 3 with contact 7 in a corresponding position along the resistors 6. The position of contact 7 is then a measure of the value of the thermocouple E. M. F. and may then serve as a measure of the temperature to which it is exposed.

In the form of Figure 1 my invention is concerned with the manner in which the contact 7 is moved along the resistances 6 to rebalance a potentiometer circuit. The contact 7 is mounted on and movable with a carriage 8 that is shifted in response to rotations of a threaded shaft 9 upon which the carriage is mounted. Also fastened to the carriage 8 is a marking element 10 that is adapted to move across a chart 11. This chart is provided with calibration marks in terms of the temperature to which the thermocouple is exposed and is driven past the marker 10 by a motor 12 and a driving drum 13.

The construction of the galvanometer 1 which I use is novel and forms a highly important feature of my invention. The galvanometer employed may desirably be heavily damped and consists of a frame 14 of usual form upon which is wound a coil 15 whose terminals 15a and 15b are connected in the potentiometer circuit. A second coil 16 is also wound upon the frame 14 and this coil has one lead connected to the pointer 2 while the other lead extends to a relay circuit to be described below. These two coils 15 and 16 do not have any electrical connection with each other. Extending from each end of the frame 14 are the usual bearing shafts that are pivoted in any suitable manner in frame members 17 and 18. The pointer 2 is attached to the lower supporting shaft and is in the form of a cross, three arms of which are threaded and receive balancing weights 19 that are adjustable to insure free turning of frame 14. The fourth arm is the pointer proper and has contact element 20 formed on its tip, which contact is adapted to cooperate with either of the adjustable contacts 21 and 22 depending upon the direction of deflection of the galvanometer coils.

Referring now to Figure 1 it will be seen that, as above described, one end of coil 16 is connected to pointer 2 while the other end is connected by a conductor 23 to a movable contact 24 that forms part of a switch. The other contact 25 of the switch is connected to one end of a relay 26 that is connected by line 27 to the midpoint between two batteries 28 and 29. The other terminal of battery 28 is connected to one end of a relay coil 30 whose other end is connected to the contact 21. In a like manner the second terminal of battery 29 is connected to one end of a relay coil 31 whose second end is connected to the contact 22. The relays 30 and 31 are adapted, when energized under control of the galvanometer, to open the normally closed switches 32 and 33, respectively, to which switches are connected on one side to the line and on the other side to the fields of a standard reversible induction motor 34 and from there to the other side of the line. In a circuit of this type when one of the switches is opened, one field of the motor is connected directly to the line and the other is connected to the line through a condenser 34a. In such a case the energizing current for one of the rotating fields lags the other to set up a rotating field in the rotatable element of the motor, the direction of rotation depending upon which is leading. Upon energization of one of the relays 30 or 31 by the galvanometer a switch is opened in one field circuit and the motor is energized to rotate shaft 9 to shift carriage 8 in the proper direction for contact 7 to rebalance the potentiometer circuit.

In the operation of this embodiment of the invention if the thermocouple voltage varies in a direction to cause coil 15 to move counterclockwise in Figure 1 the contact 20 will be moved into engagement with contact 21. In the ordinary form of galvanometer, a slight potentiometric unbalance will not result in sufficient pressure between the contacts 20 and 21 to cause sufficient current to flow through the circuit to operate relay 30, though a very small current may flow between the contacts. This flow through the circuit which includes contacts 20 and 21, coil 30, battery 28, conductor 27, coil 26, contacts 25 and 24, conductor 23, coil 16 and pointer 2, regardless of its low magnitude will produce a torque which is additive to that produced by the current in the coil 15 to thereby cause additional pressure between contacts 20 and 21, to permit a greater current flow therethrough. Thus the current builds up until it is sufficient to energize the relays 30 and 26 and open their respective switches 32 and 24. As the switch 32 opens, the motor 34 will rotate shaft 9 and adjust contact 7 along resistance 6 in a direction to restore potentiometer balance. Switch 24 is an interrupter switch which preferably is not opened until the motor 34 has performed a rebalancing operation. The time delay between the opening of switch 32 and the opening of switch 24 is due to the fact that a greater flow of current is required to actuate that relay to move contact 24 out of engagement with contact 25 and break the holding circuit. Opening of switch 24 permits relay 30 to again close switch 32 to stall motor 34 and relay 26 to close contacts 24 and 25. If the movement of contact 7 along the resistances 6 was sufficient to rebalance the potentiometer circuit the contacts 20 and 21 will now be open. If not, the same cycle of operations will occur and the motor will be rotated in a series of short, rapid steps until the potentiometer circuit is rebalanced.

Upon the occurrence of a deflection of pointer 2 in a clockwise direction the opposite of the above operations will take place and relay 31 will open switch 33 to permit motor 34 to rotate in a reverse direction from that in which it previously rotated. It is noted that the battery 29 is of such a polarity that the current flow, in this case, through the coil 16 will increase the pressure between contacts 20 and 22 until the current flow is sufficient to energize the relay 31.

The embodiment of the invention disclosed in Figure 5 is very similar to that in Fig. 1, the difference being in the manner that relay 26 is connected in the circuit. In this embodiment the relay 26 is of the time delay type and is normally energized to hold contacts 24 and 25 closed. Each of the relays 30 and 31 when energized in addition to actuating the motor switches, also open respectively switch 35 and switch 36 in the circuit of the relay 26. The switches 35 and 36 are shown connected at each end of the relay 26 so that when either is opened, switch 35 by relay 30 or switch 36 by relay 31, the connection between the batteries 28 and 29 and the relay 26 will be broken.

In the operation of this embodiment a variation in the thermocouple voltage will cause a deflection of the galvanometer pointer 2 to bring contact 20 into engagement with either contact 21 or contact 22. If, for example, the contacts 20 and 21 engage, a circuit will be completed from contact 21 through relay 30, battery 28, line 27a switch 24, 25, line 23 coil 16, pointer 2 and contact 20 to energize relay 30 in a manner previously described. When the current flow has built up sufficiently the relay 30 will open switches 32 and 35. Opening switch 32 permits motor 34 to rotate to drive shaft 9 in the proper direction, while opening switch 35 deenergizes the relay 26. When the relay 26 is deenergized an interval of time will occur before contacts 24 and 25 are separated and it is during this interval that motor 34 rotates. When contacts 24 and 25 open they break the holding circuit for relay 30 to deenergize that relay and close switches 32 and 35. The closing of the former stops the motor and the closing of the latter energizes relay 26 to close contacts 24 and 25 and places the circuits in condition for another operation.

As in the embodiment of Figure 1, if the contact 7 was not moved enough to rebalance the potentiometer circuit the operation will be successively repeated until potentiometer rebalance is obtained. Upon the occurrence of an opposite galvanometer deflection, where contacts 20 and 22 are brought into engagement, the relay 31 will be energized and it will open switches 33 and 36 to respectively cause an opposite rotation of motor 34 from that previously obtained and to deenergize the relay 26.

The embodiment of the invention disclosed in Figure 6 differs from those previously described in that only two relays are used with a condenser in each relay circuit serving to permit the necessary time delay during which the motor 34 is energized for rotation.

In this embodiment one end of relay 30 is connected, as previously, to the contact 21 while the other end is connected both to one contact of the switch 35 and one terminal of a condenser 37 of suitable capacity. The other terminal of the condenser and the other contact of the switch are both connected to one terminal of the battery 28. In a like manner one end of relay 31 is connected to contact 22 while the other end is connected to one contact of switch 36 and one terminal of a second condenser 38. The second contact of switch 36 and the second terminal of condenser 38 are connected to one terminal of battery 29. The conductor 23 in this case extends from coil 16 to a connection between the batteries.

In the operation of this embodiment a variation of the thermocouple voltage will cause a deflection of the pointer 2 to bring, for example, contacts 20 and 21 into engagement. Thus, in a manner described in connection with Figure 1, a flow of current is set up through contact 21, coil 30, switch 35, battery 28, conductor 23, coil 16, pointer 2 and contact 20. When sufficient current has been built up in the circuit the relay 30 will become energized to open switches 32 and 35. The opening of switch 32 permits the motor to rotate shaft 9 to shift contact 7 along resistances 6 in a direction to rebalance, or tend to rebalance, the potentiometer circuit. The opening of switch 35 breaks the circuit for relay 30, but the relay is not instantly deenergized due to the charging of condenser 37. The interval of time during which the condenser is charging after switches 32 and 35 have been opened and before the relay 30 is deenergized is the time during which the motor 34 is rotating shaft 9. This operation is, as in the previously described forms of the invention, rapid enough so that a substantally continuous rotation of the motor is obtained until the potentiometer circuit is rebalanced. For an opposite deflection of the galvanometer the same operation would take place through relay 31 and condenser 38 to energize the motor 34 for rotation in the opposite direction.

The embodiment of the invention disclosed, in Figure 7 is similar to that of Figure 6 except that only one condenser is used instead of two. Also there is disclosed in this embodiment the use of a rectifier in a source of A. C. voltage to produce the D. C. for the relays instead of the batteries previously disclosed. It is of course to be understood that the batteries may be used if desired in this case just as the rectifier can be used instead of the batteries in the previously described embodiments.

One end of relay 30 is connected as usual to contact 21 and the other end is connected at 39 to a voltage divider 40. The other relay 31 is connected at 41 to the other end of the voltage divider 40 and to the contact 22. A center tap 42 of the voltage divider is connected through the switches 35 and 36 to the conductor 23 and from there to the coil 16 to complete the circuit for the relays 30 and 31 respectively when pointer 2 is deflected to bring contact 20 into engagement with either contact 21 or contact 22. Shunted across the switches 35 and 36 is a variable resistance 43 and a condenser 44 in series, which upon opening of either switch 35 or 36 is placed in circuit with the relays 30 or 31. The voltage divider 40 is supplied from an A. C. source through a copper oxide rectifier 45 of usual type and a transformer 46.

In the operation of this embodiment of the invention a deflection of the galvanometer pointer 2 will move contact 20 into engagement with, for example, contact 21. A circuit will thus be completed from contact 21, relay 30, the upper half of voltage divider 40, through center tap 42, switch 35, switch 36, conductor 23, coil 16, pointer 2 to contact 20. When the current is sufficient the relay 30 will be energized to open switches 32 and 35. As in the previously described embodiments of the invention the opening of switch 32 will permit the motor 34 to rotate shaft 9 and move contact 7 across resistances 6 to rebalance or tend to rebalance the potentiometer circuit. The opening of switch 35 breaks the circuit for relay 30, but deenergization of the relay is delayed due to the subsequent charging of condenser 44. The time interval during which the charging of the condenser takes place determines the lengths of time that the motor 34 is rotating and this interval can be varied by adjusting the value of resistance 43.

In a similar manner a deflection of the galvanometer to bring contact 20 into engagement with contact 22 would cause energization of relay 31, this time using the lower half of the voltage divider 40 between point 41 and center tap 42 in order to reverse the direction of flow of the current in the circuit. This is necessary in order that the coil 16 will bias the pointer toward contact 22 instead of toward contact 21 as it formerly did.

In each of the above described embodiments of the invention, the additional torque on the galvanometer that is derived from the secondary coil 16 is used to add to the unbalance of the galvanometer. I have discovered that if this force, with relation to the galvanometer design is such that it tends to slightly bend the pointer 2 between its point of support and contact 20 or to shift the coil in its pivots, or both, a rapid recoil takes place when the circuit is broken. The effect secured is quite valuable and substantial in that it gives an acceleration feature to the operation of the device.

In a self-balancing instrument of the general type shown in Fig. 1, "hunting" or oscillation of the device may occur by virtue of the time lags and particularly the mechanical time lags involved. For example, the time necessary to overcome the inertia of even a light and delicate galvanometer pointer is so great compared to the speed of the electrical changes in the potentiometer system that nothwithstanding the rotation of motor 34 into a position which the contact should occupy to rebalance the system under a stabilized condition, the galvanometer will effect further motor rotation before such rotation is interrupted. While for a slow motor operation, the system may be suitably damped with auxiliary means, it is essential for high-speed recorder operation to insure that motor 34 will come to rest exactly at its balance point. The recoil action referred to above following deenergization of the galvanometer coil 16, if properly predetermined in magnitude, as it can be by adjustment of the biasing force of coil 16, in a manner hereinafter described, will restore the galvanometer to its neutral position, thereby interrupting the action of the rebalancing motor.

Figure 8:
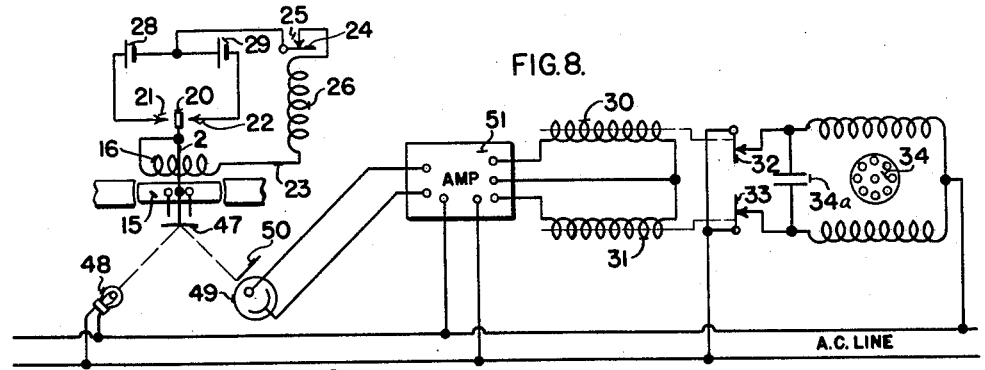
Figs. 8 to 10 are wiring diagrams of my invention in which the galvanometer pointer does not directly detect the measuring circuit unbalance.

Another type of relay mechanism with which my invention may be used is shown in Fig. 8. In the previously described embodiment the pointer 2 was used both to detect the unbalance of the measuring circuit and to close the circuit through coil 16. That this double function of the pointer is not necessary is shown in the embodiment now to be described.

In Figure 8 the galvanometer coil 15 is responsive to variations in the measuring circuit as in the previously described embodiment. The coil has attached to it for movement therewith, in addition to the pointer 2, a mirror 47 that is adapted to reflect a beam of light from some suitable source, such as from the lamp 48, to a photocell 49. A mask 50 is provided in front of cell 49 so that if the galvanometer deflects in one direction the beam falls on the cell and if it deflects in the other direction the beam is on the mask. The current from cell 49 goes to an amplifier 51 that is used to energize one or the other of the relays 30 or 31 depending upon whether the light beam is on the cell 49 or the mask 50. If the galvanometer is in its neutral position the beam falls equally on the cell and mask and neither of the relays is energized.

Various forms of amplifier relays are available which would be suitable for use as amplifier 51, and in particular the device 51 may include a relay for a coil responsive to the amplified photocell current and a pair of contacts adapted to control the energization of coils 30 and 31 except for the normal current condition of the photo-cell circuit existing when the galvanometer is in its neutral position. See, for example, the amplifier disclosed below in connection with Figure 11.

When either of the relays 30 or 31 is energized it opens its switch 32 or 33, respectively, to permit rotation of the motor 34. As the galvanometer deflects it brings contact 20 on pointer 2 into engagement with either contact 21 or 22 to complete a circuit through one of the contacts, battery 28 or 29, switch contacts 24 and 25, coil 26, line 23, coil 16 back to pointer 2. The battery brought into the circuit is of such a polarity that the current flow through coil 16 increases the bias of pointer 2 in its initial direction to increase the pressure between contact 20 and contacts 21 or 22. As the current in the relay 26 increases it will move contact 24 away from contact 25 to break the circuit and the galvanometer pointer 2 will spring back to its neutral position; this also moves the beam of light until it is equally on the cell 49 and mask 50 to deenergize whichever of relays 30 or 31 was energized. If the rotation of the motor 34 was sufficient to rebalance the measuring circuit the galvanometer coil will remain in its neutral position, if not the same cycle of operations will be repeated until the measuring circuit is rebalanced.

Figure 9:
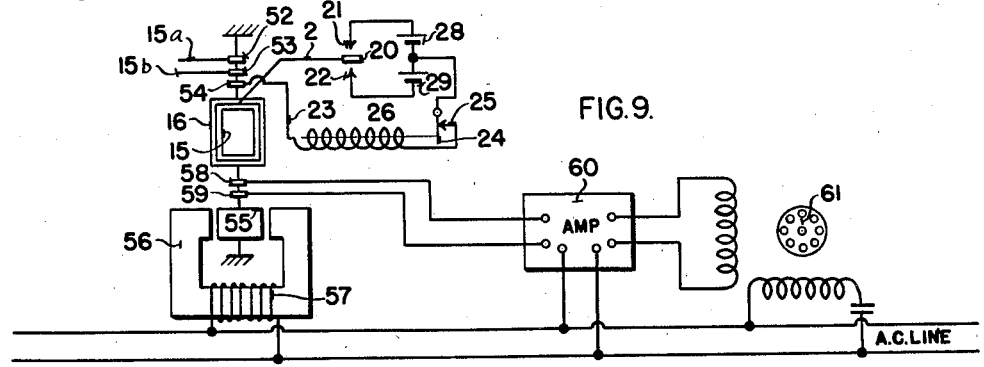

Another type of relay mechanism is shown in connection with my invention in Figure 9, which relay uses a so-called "A. C.-D. C." galvanometer. As shown the moving coil 15 of the galvanometer is connected by means of pigtails or slip rings 52 and 53 with the leads 15a and 15b while the auxiliary coil 16 is connected at one end by slip ring 54 with the conductor 23. A pick-up coil 55, which is positioned in an alternating magnetic field, is connected to the pivot of the galvanometer coils 15 and 16 and is arranged to be rotated therewith. The pick-up coil is connected between the poles of a suitable field structure 56 on which is wound a field winding 57 that is energized from a suitable A. C. supply line, and is so arranged with respect to the poles of the field structure 56 that when the coil 15 is in its undeflected position the pick-up coil is in zero inductive relation to the alternating magnetic field set up in the field structure. When the galvanometer moving coil 15 deflects in one direction or the other the pick-up coil deflects accordingly and, as a result, an alternating voltage in phase with or 180° out of phase with the line voltage will be induced in the pick-up coil.

In the operation of this embodiment, when the thermocouple voltage changes the galvanometer moving coil 15 will be deflected in one direction or the other and thereby the pick-up coil 55 will be rotated into inductive relation with the alternating magnetic field set up by the field structure 56, resulting in the induction of an alternating voltage in the pick-up coil. The phase and amplitude of the alternating current so induced is determined by the direction and extent of deflection, respectively. The induced alternating voltage is connected through suitable pigtails or slip rings 58 and 59 to the input terminal of an electronic amplifier 60. The output of amplifier 60 is connected to one winding of a rotating field motor 61, the other field of which is connected to line. As is well known, motor 61 is energized for rotation in one direction or the other depending upon the phase of the current supplied from amplifier 60. As in the preceding embodiments motor 61 is adapted to effect an adjustment in the rebalancing direction of the contact 7 along the resistances 6.

The function of coil 16 is the same in this embodiment as it was in the embodiment of Fig. 8, namely to effect rapid mechanical rebalance of the galvanometer. Upon deflection of the galvanometer, pointer 2 will bring contact 20 into engagement with either contact 21 or 22 to complete a circuit from one of those contacts through either battery 28 or 29, switch contacts 25, 24, coil 26, line 23, slip ring 54, coil 16 to the pointer 2. When the current flow through the relay 26 has increased to a large enough value the relay will be energized to open contacts 24 and 25 to break the circuit. If the potentiometer circuit is not rebalanced the cycle will be repeated until such time as it is.

Figure 10:
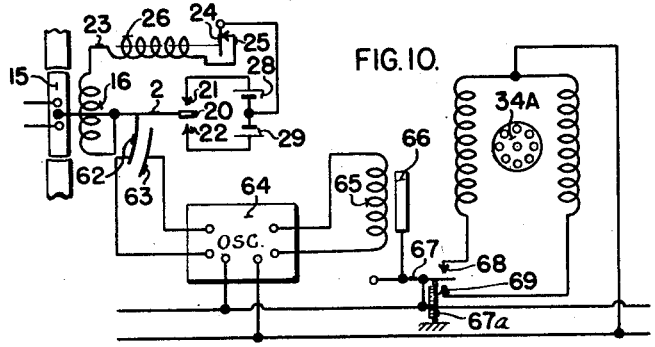

My invention is shown in Figure 10 in use with a capacitance type relay. In this embodiment a condenser plate 62 is carried by and insulated from the pointer 2. This plate moves relative to a second stationary condenser plate 63, the plates being connected to an oscillator 64 the output current of which varies in response to the relative positions of the plates 62 and 63. As the output current of the oscillator varies the energization of a relay coil 65 varies in accordance therewith to shift its armature 66 that is used to control the position of a switch member 67, which is pivoted at its left end. An adjustable spring 67a urges member 67 toward contact 69 from which it is normally held in the neutral position of the galvanometer by the normal current value in coil 65.

In the operation of this embodiment of the invention when the pointer 2 is in its neutral position the plates 62 and 63 are in such relative positions that the oscillator output current through relay 65 is sufficient to keep the switch member 67 out of engagement with contact 69. When, however, the galvanometer deflects due to a change in the thermocouple voltage the relative positions of the plates 62 and 63 are changed to vary oscillator output current and thereby either increase or decrease the energizing force of relay 65 and bring switch member 67 into engagement respectively with contact member 68 or 69. Contacts 68 and 69 are connected to the fields of an ordinary reversible series motor 34A which is adapted to serve the same purpose as motor 34 of Fig. 1.

The coil 16 has the same function in this embodiment of the invention as it has in the previously described ones and operates here in a manner identical to Figures 8 and 9.

The embodiment of the invention disclosed in Figure 11 is very similar to that disclosed in Figure 8, but differs from that embodiment and from the other embodiments previously disclosed in that the pointer 2 does not form part of the electrical circuit for the coil 16. In this form the pointer cooperates with adjustable stops 70 and 71 to limit its movement and that of the mirror 47.

The circuit for the coil 16 extends from one end of the coil through conductor 23, normally closed contacts 24, 25, relay 26, normally open switches 72 or 73, actuated by relays 30 or 31, batteries 28 or 29, respectively, and conductor 74 to the coil 16. In this case the contact member 24 is shown provided with an adjustable spring 24a that tends to hold it in closed position. In this manner more current has to be built up in the coil 26 before it can break the circuit through contacts 24 and 25 and an adjustable time delay is provided. It is obvious that a similar spring may be used if desired, in this relay in the other embodiments of the invention.

In the operation of this embodiment, a variation of the measuring E. M. F. through the coil 15 will cause a deflection thereof to move pointer 2 into engagement with one of the stops 70 or 71 and move mirror 47 so that it will reflect the beam of light either completely on the photocell 49 or the mask 50. In either case one of the relays 30 or 31 will be energized. Assuming that relay 30 is energized, the switch 32 will be opened to permit motor 34 to run and shift the contact 7 along resistances 6. At the same time the switch 72 will be closed to complete the circuit between it, battery 28, coil 16, switch 24, 25 and the relay 26. When sufficient current has been built up in the relay 26 to overcome the force of spring 24a it will open switch 24, 25 to deenergize the coil 16 and permit the galvanometer to move to its neutral position. If the measuring circuit has not been completely balanced the cycle will be repeated until such is the case.

From the above description it will be seen that by providing a second coil in the galvanometer I am able to use the galvanometer pointer directly to actuate the rebalancing system of a potentiometer circuit. By having the two coils on the galvanometer frame separate from each other no disturbing influence is introduced into the thermocouple circuit and its initial sensitivity can be retained. The motor 34 is caused to rotate in a series of steps that are short enough to give small movements to the contact 7 and thus render the possibility of moving the contact too far negligible. On the other hand the steps follow each other in quick enough succession that for larger unbalances of the potentiometer circuit the rotation of the motor 34 is substantially continuous so that the contact 7 may move smoothly across the resistances 6.

In cases where the pointer does not form part of the electrical relay system it still serves an important part by acting as an element in the circuit of the auxiliary coil 16 or acting as a stop to limit the deflection of the galvanometer coils. In any event the use of the pointer in a manner above disclosed and the auxiliary coil on the galvanometer produces a quick acting and inherently stable device which has an anticipating effect. The latter is true because after each rebalancing step of the motor the recoil action produced by deenergization of the coil 16 always returns the galvanometer toward its neutral position to immediately stop the motor 34 and prevent any overrun or hunting of the system if the potentiometer has reached balanced condition. The introduction of the relays in the system permits the use of a motor which is sufficiently powerful to move the contact 7 and pen 10 and to actuate any desired controls that may be used in connection with the system.

I have thus provided a measuring instrument which is free to instantaneously respond to any variation in the condition which it is being used to measure, without the necessity of relying on the cyclic operation of any relay mechanism and without the necessity of introducing the resulting complications of such a relay mechanism into the instrument.

It should be noted in connection with the recoil or acceleration effect, particularly in connection with Fig. 9 which does not employ a contacting relay for rebalancing motor control, that advantage may be taken of this effect in a device which does not include a step-by-step motor action, which step-by-step action in itself tends to decrease the necessity for anti-hunting or acceleration features.

While in accordance with the provisions of the statutes, I have illustrated and described the best form of my invention now known to me, it will be apparent to those skilled in the art that changes may be made in the form of the apparatus disclosed without departing from the spirit of my invention as set forth in the appended claims and that in some cases certain features of my invention may sometimes be used to advantage without a corresponding use of other features.

Having now described my invention, what I claim as new and desire to secure by Letters Patent is:

1. In a self-balancing measuring instrument, a galvanometer having a pair of coils associated therewith and a pointer, one of said coils being in the measuring circuit which includes a variable to be measured and to which said coil is responsive, a motor for rebalancing said circuit, control circuits for said motor, the other of said coils being selectively connected in one or the other of said control circuits in accordance with the direction of deflection of said galvanometer pointer in response to changes in said variable.

2. In a measuring instrument a galvanometer responsive to variations in a measurable condition, a control circuit comprising a relay coil, a switch actuated thereby and a source of current, a condenser shunted across said switch, means responsive to deflections of said galvanometer to close said circuit and energize said relay coil to open said switch, charging of said condenser preventing immediate deenergization of said relay coil.

3. In a measuring instrument a galvanometer deflecting in response to variations in a measurable condition, a circuit comprising a normally deenergized relay coil, a normally closed switch operated thereby, and a source of current, a second switch in said circuit closed in response to deflections of said galvanometer to thereby close said circuit to energize the relay coil and open the first switch, a condenser shunted across said first switch, the condenser charging through the relay coil when the first switch is opened.

4. In a measuring instrument, a galvanometer deflecting in response to variations in a measurable condition, a first circuit comprising a first relay coil, a source of current, a second relay coil and a switch operated thereby, a second circuit comprising a third relay coil, a source of current, said second relay coil and said switch, means responsive to deflections of said galvanometer to close one of said circuits to energize said first or third and second relay coils, said second relay coil opening the said switch to deenergize said relay coils, and control apparatus operated by said first and third relay coils.

5. In a device of the class described, control circuits each comprising a relay coil, a switch operated thereby to open the circuit and a source of current supply, a condenser shunted across said switches, a device responsive to variations in a condition adapted to complete one or the other of said circuits to cause energization of one or the other of said relay coils to open its respective switch in response to the direction of the variation, and control apparatus operated in response to the energization of one of said relay coils.

6. In a measuring instrument the combination with a potentiometer circuit, a galvanometer having a pointer and a pair of unconnected coils, one of said coils being in the potentiometer circuit, a pair of alternate control circuits, means including said pointer to connect the second galvanometer coil in one of said control circuits depending upon the direction of movement of said pointer and control apparatus operated by said control circuits.

7. In a self-balancing measuring instrument, a galvanometer having a pair of coils, one of said coils being in the measuring circuit which includes a variable to be measured and to which said coil is responsive, a motor for rebalancing said circuit, control circuits for said motor responsive, respectively, to the direction of deflection of the galvanometer, means to quickly open either of said control circuits upon completion thereof comprising the second of said coils, means to energize said second coil and means to deenergize said second coil a predetermined time later.

8. In a self-balancing measuring instrument, a galvanometer having a pair of coils associated therewith one of which is in a measuring circuit that includes a variable to be measured and to which said coil is responsive, a motor to rebalance said circuit, control circuits for said motor responsive, respectively, to said galvanometer deflections in one sense or the other, an additional biasing force for said galvanometer including said second coil, means to energize said coil in opposite directions in response to deflection of said galvanometer in one direction or in the opposite direction from a neutral position, and means operative in response to energiaztion of said second coil to complete one of said motor circuits.

9. In a measuring instrument, the combination with a galvanometer having two coils associated therewith one of which is connected in a measuring circuit that has a variable to be measured to which said coil is responsive, a pair of biasing circuits each including said second coil, means responsive to deflection of said galvanometer in either direction to close one or the other of said biasing circuits to add an additional force to the galvanometer in one direction or the other, means forming part of each circuit to break said biasing circuit and suddenly release said force whereby the galvanometer will spring back toward its neutral position.

10. In a measuring instrument, a galvanometer adapted to deflect in both directions from a midposition and having two coils, one of said coils being in a measuring circuit and being responsive to variations thereof to cause deflections of said galvanometer, a pair of control circuits each comprising a relay coil and a source of current, means responsive to deflection of said galvanometer to place the second coil thereof into one of said control circuits and to close the said circuit whereby to energize said relay coil, means responsive to said energization to break said circuit and time delay means to retard deenergization of said relay coil.

11. In a measuring instrument the combination with a measuring circuit, a galvanometer having two independent coils one of which is in said measuring circuit, a pointer for said galvanometer, the second of said coils being connected at one end to said pointer, a pair of control circuits each including said second coil, said pointer, an individual source of current and an individual relay coil, means responsive to deflection of the pointer in one direction to close one of said circuits and to deflection of the pointer in the opposite direction to close the other of said circuits and thereby energize one of said relay coils, means operative upon closure of the circuit to open the circuit and means to inject a time delay into the opening means.

12. In a measuring instrument, a galvanometer responsive to a variable condition, a coil carried by said galvanometer, a motor, a pair of control circuits therefore each including said coil, means responsive to deflection of said galvanometer in either direction to energize one of said pair of control circuits for said motor depending upon the direction of deflection, adjustable mechanical stops to limit the deflection of said galvanometer, completion of either of said control circuits through said coil operating to bias said galvanometer for further rotation in the direction of the stop limiting the movement thereof, and means operated following completion of either of said control circuits to break said control circuit, discontinue said biasing means, and stop said motor.

13. In a measuring instrument the combination with a measuring circuit, of a galvanometer having a pair of coils associated therewith one of which is in said measuring circuit, a pointer for said galvanometer having a contact on the end thereof, a pair of cooperating contacts, the second of said coils being electrically connected to said pointer, a pair of control circuits each including said second coil, said pointer and its contact, a source of current, a relay coil and one of said cooperating contacts, deflection of the pointer in one direction into engagement with one of said cooperating contacts operating to close one control circuit, and deflection of the pointer in the opposite direction into engagement with the other of said pair of contacts operating to close the other control circuit, completion of either of said control circuits through said second coil operating to bias said pointer for further rotation in the direction of the cooperating contact it is engaging, and means operating following the completion of either control circuit to break said control circuit and discontinue said biasing means.

EARL A. KEELER.